United States Patent
Kajino et al.

(10) Patent No.: US 8,339,237 B2
(45) Date of Patent: Dec. 25, 2012

(54) MULTILAYER PTC THERMISTOR

(75) Inventors: Takashi Kajino, Tokyo (JP); Kazuhiko Itoh, Tokyo (JP); Teiichi Tanaka, Tokyo (JP); Atsushi Hitomi, Tokyo (JP); Takashi Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/221,466

(22) Filed: Aug. 30, 2011

(65) Prior Publication Data

US 2012/0056709 A1  Mar. 8, 2012

(30) Foreign Application Priority Data

Sep. 6, 2010  (JP) ................. 2010-199249

(51) Int. Cl.
*H01C 7/10* (2006.01)

(52) U.S. Cl. ........ 338/22 R; 338/20; 338/307; 338/309; 338/332

(58) Field of Classification Search ............. 338/22 R
See application file for complete search history.

(56) References Cited

U.S. PATENT DOCUMENTS

| | | | | |
|---|---|---|---|---|
| 5,210,516 A | * | 5/1993 | Shikama et al. | 338/22 R |
| 5,547,907 A | * | 8/1996 | Katsumata et al. | 501/76 |
| 6,040,755 A | * | 3/2000 | Abe et al. | 338/22 R |
| 6,791,163 B2 | * | 9/2004 | Kishimoto et al. | 257/634 |

FOREIGN PATENT DOCUMENTS

| | | |
|---|---|---|
| JP | A-5-36501 | 2/1993 |
| JP | A-8-51002 | 2/1996 |
| JP | A-10-22104 | 1/1998 |
| JP | A-2004-128488 | 4/2004 |
| JP | A-2010-27804 | 2/2010 |
| WO | WO 2008/123078 A1 | 10/2008 |

* cited by examiner

*Primary Examiner* — Kyung Lee

(74) *Attorney, Agent, or Firm* — Oliff & Berridge, PLC

(57) ABSTRACT

A multilayer PTC thermistor 100 includes a ceramic body 10 having a plurality of ceramic layers 12 and internal electrodes 14 between adjacent ceramic layers 12, external electrodes 30 on the end faces 10a, 10b of the ceramic body 10, and a glass layer 20 on the surfaces 10c, 10d of the ceramic body 10, the glass layer 20 containing an oxide of at least one element selected from the group consisting of zinc and bismuth as the major component, wherein the alkali oxide content of the glass layer is no greater than 0.8 mass %.

10 Claims, 3 Drawing Sheets

MULTILAYER PTC THERMISTOR

BACKGROUND OF THE INVENTION

1. Field of the Invention

The present invention relates to a multilayer PTC thermistor.

2. Related Background Art

PTC (Positive Temperature Coefficient) thermistors are known as thermistors with positive resistance temperature characteristics, or increased resistance with increased temperature. PTC thermistors are constructed by forming at least a pair of opposing electrodes on a material having a positive temperature coefficient. PTC thermistors are utilized in self-regulating heating units, overcurrent protection elements, temperature sensors and the like.

As PTC thermistors there are known polymer PTCs comprising a body formed using materials obtained by mixing resins and metal powders. With polymer PTCs, the temperature coefficient of the resin is greater than that of the metal powder, and therefore the mutual distance between the metal powder increases as the temperature rises, such that the resistance of the body undergoes rapid increase. Since the temperature coefficient of resistance is large in such a polymer PTC, it is possible to reduce the maximum current during operation when it is used in an overcurrent protection element. However, when a polymer PTC is repeatedly operated, the resistance increases and the power consumption during non-operation tends to gradually increase.

Ceramic PTCs are also known, in which a ceramic body is formed using a ceramic material with a positive temperature coefficient. A ceramic PTC utilizes the fact that resistance drastically increases as the Curie point is approached. For example, a barium titanate-based dielectric material has a ferroelectric conversion point (Curie point) near 200° C. Even with repeated operation, a ceramic PTC allows resistance increase during non-operation of the PTC to be sufficiently inhibited compared to a polymer PTC. The PTC power consumption can thus be reduced.

In recent years, multilayer PTC thermistors have been employed which have increased electrode areas by embedding of laminar internal electrodes, as a strategy to reduce room temperature resistivity. A multilayer PTC thermistor has a ceramic body and external electrodes on the end faces of the ceramic body. In the external electrode, a film-like electrode layer is formed on the surface section by a plating method or thin-film process, in order to inhibit erosion from soldering during mounting. From the viewpoint of production cost, plating methods are superior to thin-film processes. However, because the ceramic body is porous, when wet plating is carried out to form a terminal electrode after the ground layer electrode has been formed, the plating solution infiltrates into the porous ceramic body. When this occurs, power fed from the internal electrode causes attachment of plating onto the interior of the ceramic body, which is a porous body, and over the entire surface, resulting in shorts between terminals.

Techniques of forming a coating layer such as a glass layer on the ceramic body surface are known for preventing infiltration of the plating solution into the ceramic body interior. For example, Japanese Unexamined Patent Application Publication No. 2004-128488 (Patent document 1) proposes forming an alkaline glass layer on the ceramic body surface to prevent infiltration of the plating solution into the ceramic body.

SUMMARY OF THE INVENTION

According to investigation by the present inventors, it is possible to minimize plating adhesion onto the entire surface of the ceramic body by using an alkaline glass layer such as in Patent document 1. However, it has been found that fine pinholes are generated in the alkaline glass layer that covers the ceramic body surface, and that the plating solution infiltrates into the ceramic body through these pinholes, creating outer appearance defects where the plating adheres at these sections, and leading to variation in characteristics after plating treatment.

On the other hand, while formation of a surface layer on the external electrode using a thin-film process instead of a plating method can be carried out to prevent corrosion by the plating solution, such thin-film processes increase production cost and therefore cannot be considered for mass production. In addition, flux can potentially infiltrate into the ceramic body during mounting, resulting in deterioration of the characteristics.

The present invention has been accomplished in light of these circumstances, and its object is to provide a multilayer PTC thermistor having low production cost, excellent PTC characteristics and high reliability.

In order to achieve this object, the invention provides a multilayer PTC thermistor comprising a ceramic body comprising a plurality of ceramic layers and an internal electrode between adjacent ceramic layers, external electrodes on the end faces of the ceramic body, and a glass layer on the surface of the ceramic body, which glass layer contains an oxide of at least one element selected from the group consisting of zinc and bismuth as the major component, wherein the alkali oxide content of the glass layer is no greater than 0.8 mass %.

The multilayer PTC thermistor of the invention can be produced with low production cost because the surface layer of the external electrode can be formed by plating treatment. In addition, it has a glass layer comprising an oxide of at least one element selected from group consisting of zinc and bismuth as the major component on the surface of the ceramic body, wherein the alkali oxide content is no greater than 0.8 mass %. Because it has such a glass layer, the firing temperature during formation of the glass layer is lower than the glass that is mainly composed of $SiO_2$, and deterioration of the ceramic body during glass layer formation can be sufficiently inhibited.

Furthermore, because it has the glass layer on the ceramic body surface, infiltration of the plating solution into the ceramic body can be adequately minimized even with plating treatment. In addition, it is possible to prevent deterioration of characteristics caused by flux infiltrating into the ceramic body during mounting. The present inventors believe the reason for this to be the following. Specifically, the alkali oxide in the alkaline glass has very high reactivity with water and readily absorbs moisture. Presumably, this moisture is desorbed and gasifies during glass firing, creating pinholes in the glass layer. On the other hand, the glass layer in the multilayer PTC thermistor of the invention comprises an oxide of at least one element selected from the group consisting of zinc and bismuth as the major component, wherein the alkali oxide content is no greater than 0.8 mass %. With such a glass layer, it is possible to adequately reduce generation of air bubbles during formation of the glass layer by firing. Based on these factors, it is conjectured that the dense glass layer with a reduced number of pinholes minimizes deterioration due to plating treatment and results in a multilayer PTC thermistor with excellent PTC characteristics.

Moreover, the glass layer in the multilayer PTC thermistor of the invention has a lower melting point than the glass layer containing $SiO_2$ as the major component. Furthermore, although glass with numerous alkaline components tends to undergo significant expansion when fired at a temperature of at least 30° C. higher than the softening temperature, limiting the alkali oxide content to no greater than 0.8 mass % as according to the present invention can adequately inhibit expansion even with firing at a high temperature of more than 100° C. higher than the softening temperature. Consequently, if the firing temperature is set to a temperature sufficiently higher than the softening temperature, the flow property during firing can be improved, and it is possible to smoothly eliminate air bubbles that are produced from the ceramic body during firing. It is conjectured that this allows pinholes in the glass layer to be reduced, to obtain a multilayer PTC thermistor with excellent PTC characteristics. However, the reason for which a multilayer PTC thermistor with excellent PTC characteristics is obtained is not limited to the above conjecture.

The ceramic body in the multilayer PTC thermistor of the invention preferably has the glass component diffused in the pores (open pores) of the ceramic layer, to be adjacent to the glass layer, and the glass layer thickness is preferably greater than the thickness of the diffused portion (diffusion layer). If the ceramic body in the multilayer PTC thermistor of the invention is formed using glass having an alkali oxide content of no greater than 0.8 mass %, it will be possible to accomplish firing at a temperature for a satisfactory flow property of the glass during firing. This will allow permeation of the glass into the open pores of the ceramic body, which is a porous body. It will thus be possible to form a diffusion layer comprising the glass component on the surface layer of the ceramic body. On the other hand, if the diffusion layer is thicker than the glass layer, pinholes may be generated in the glass layer due to variations (deviations) in diffusion depending on the location. In addition, the alkaline component will tend to diffuse into the interior of the ceramic body, altering the PTC characteristics. By forming a diffusion layer on the surface layer of the ceramic body, and limiting the thickness to no greater than the thickness of the glass layer, it is possible to obtain a multilayer PTC thermistor with even more excellent PTC characteristics, while adequately minimizing deterioration of the ceramic body by plating treatment.

The ceramic body in the multilayer PTC thermistor of the invention preferably has pores containing an oxidizing gas. This will allow a multilayer PTC thermistor to be obtained that has minimized reduction of the ceramic body and can maintain excellent PTC characteristics for prolonged periods.

The glass layer in the multilayer PTC thermistor of the invention is preferably amorphous glass. Using crystallized glass will tend to produce pinholes at the grain boundaries. If amorphous glass is used, it will be possible to adequately minimize generation of pinholes. This will allow the glass layer to be even further densified, to even more adequately minimize deterioration of the ceramic body that occurs with plating treatment.

The glass layer in the multilayer PTC thermistor of the invention is preferably formed by adhering a dispersion comprising glass powder, a binder and a solvent to a ceramic body to form a layer containing glass powder on the surface of the ceramic body, and heating this at above the softening temperature of the glass powder. The glass layer obtained by this method has sufficiently reduced volatile components, and is therefore even more dense. In addition, since the glass layer is softened at one point, the fine pinholes can be blocked during melting of the glass. This will make it possible to even more adequately minimize deterioration of the ceramic body that occurs with plating treatment.

Also, when the glass layer is formed by a thin-film process such as sputtering, vapor deposition or CVD, the formed glass layer is preferably fired at above the softening temperature of the glass. This will allow the diffusion layer to be formed on the surface layer of the ceramic body. In addition, it will be possible to block the fine pinholes in the glass layer with the softened glass.

According to the invention it is possible to provide a multilayer PTC thermistor having low production cost, excellent PTC characteristics and high reliability.

DESCRIPTION OF THE PREFERRED EMBODIMENTS

Figure 1:
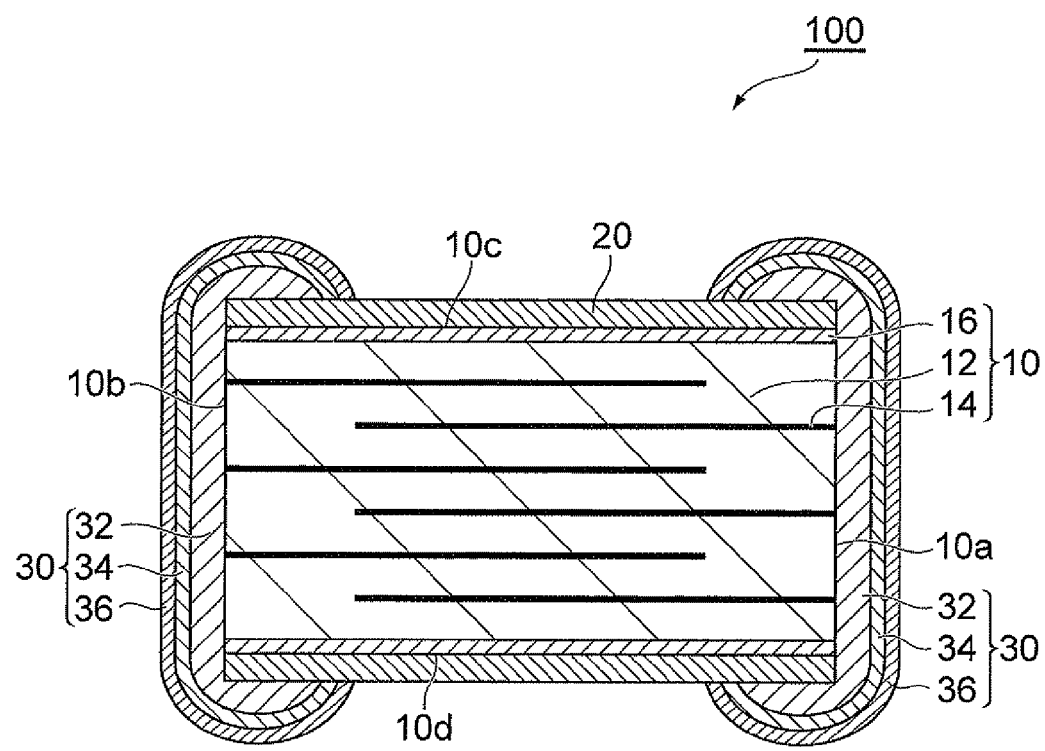
FIG. 1 is a cross-sectional view showing a preferred embodiment of a multilayer PTC thermistor of the invention.

Preferred embodiments of the invention will now be explained with reference to the accompanying drawings where necessary. For the drawings, identical or corresponding elements will be referred to by like reference numerals and will be explained only once.

FIG. 1 is a cross-sectional view showing a preferred embodiment of a multilayer PTC thermistor of the invention. The multilayer PTC thermistor 100 comprises a cuboid ceramic body 10 having a plurality of laminated ceramic layers 12 and internal electrodes 14 embedded between the adjacent ceramic layers 12, a pair of external electrodes 30 covering the pair of end faces 10a, 10b of the ceramic body 10, and a glass layer 20 covering the surfaces other than the end faces 10a, 10b of the ceramic body 10.

The main side of the ceramic body 10 is the side perpendicular to the direction of lamination of the ceramic layer 12, and the end faces of the ceramic body 10 are the sides parallel to the direction of lamination, and perpendicular to the main side. The glass layer 20 covers the pair of main sides 10c, 10d of the ceramic body 10 and the pair of lateral sides (not shown) perpendicular to the main sides 10c, 10d and end faces 10a, 10b.

The end face 10a and end face 10b of the ceramic body 10 have one electrode end of each of the internal electrodes 14 alternately exposed, while the other electrode end is located inside the ceramic body 10. The pair of external electrodes 30 formed on the end faces 10a, 10b of the ceramic body 10 are each connected to the electrode ends of the internal electrodes 14 exposed at the end faces 10a, 10b of the ceramic body 10.

A glass layer 20 is formed on the sides of the main sides 10c, 10d of the ceramic body 10, the entirety of the main sides 10c, 10d being covered by the glass layer 20. The external electrode 30 covers the entirety of the end faces 10a, 10b of the ceramic body 10, and a portion of the surface of the glass layer 20, wrapping from the end faces 10a, 10b around the sides of the main sides 10c, 10d and side faces, at the perimeters of the side faces and the perimeters of the sides of the main sides 10c, 10d.

The ceramic layer 12 of the ceramic body 10 comprises, for example, a barium titanate-based compound. The barium titanate-based compound preferably has a composition of formula (I), for example.

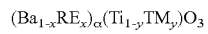

$$(Ba_{1-x}RE_x)_\alpha(Ti_{1-y}TM_y)O_3 \qquad (1)$$

In formula (1), RE represents at least one element selected from the group consisting of Y, La, Ce, Pr, Nd, Sm, Gd, Dy and Er. Also, TM represents at least one element selected from the group consisting of V, Nb and Ta.

In formula (1), a portion of the Ba sites of barium titanate ($BaTiO_3$) are replaced with RE and a portion of the Ti sites are replaced with TM. In this embodiment, replacing a portion of the Ba sites with RE and a portion of the Ti sites with TM can produce a multilayer PTC thermistor exhibiting low resistance and an excellent PTC characteristic.

Also the values for x and y representing, respectively, the number of Ba sites replaced by RE and the number of Ti sites replaced, by TM in formula (1) preferably satisfy inequalities (2) and (3), for example.

$$0.001 \leq x \leq 0.003 \quad (2)$$

$$0 \leq y \leq 0.002 \quad (3)$$

The value of α representing the molar ratio of Ba to Ti sites preferably satisfies inequality (4), for example. This can result in an even higher jump characteristic.

$$0.99 \leq \alpha \leq 1.1 \quad (4)$$

Specific examples of such barium titanate-based compounds include compositions of formula (5).

$$(Ba_{0.9985}Gd_{0.0015})_{0.995}(Ti_{0.9985}Nb_{0.0015})O_3 \quad (5)$$

The ceramic layer 12 comprises the barium titanate-based compound as a major component, and may also comprise MnO or $SiO_2$ as accessory components.

The relative density of the ceramic body 10 and the ceramic layer 12 is 70-90%, for example. If the relative density exceeds 90%, the excellent PTC characteristic may be impaired, depending on the composition. If the relative density is less than 70%, on the other hand, the strength of the ceramic body 10 will tend to be impaired.

The ceramic layer 12 preferably comprises gas with an oxidative property (oxidizing gas) in the pores (open pores). The oxidizing gas may be air, oxygen gas, or a mixed gas comprising oxygen gas with argon gas, nitrogen gas or helium gas. The oxygen gas concentration of a mixed gas is at least 5 vol % and less than 100 vol %, for example. When a gas other than an oxidizing gas is contained in the pores, or when the pores are a vacuum, the pore wall faces of the ceramic body 10 will tend to be reduced, impairing the excellent PTC characteristic, depending on the thermal history during mounting.

If a resin fills the pores of the ceramic layer 12, the resin will deprive the ceramic layer 12 of oxygen during heating, undergoing combustion and causing the ceramic layer 12 to be reduced, which is undesirable.

The internal electrodes 14 each comprise a conducting material that can form an ohmic joint with the ceramic layer 12. Specific examples of conducting materials include Pd or Pd-containing alloys, Pt, Ni and the like. Ni is inexpensive and therefore a preferred material, but the firing for formation of the ceramic body 10 must be carried out in a reducing atmosphere in most cases. Firing in a reducing atmosphere reduces the metal oxide on the surface of the ceramic body 10 and lowers the resistance, such that no PTC characteristic is exhibited. Therefore, firing is followed by impregnation of the ceramic body 10 with an alkaline component such as sodium nitrate and heating in air at 700-800° C., for reoxidation of the surface of the ceramic body 10. A PTC characteristic will be exhibited as a result.

The external electrode 30 preferably has a built-up structure obtained by successive lamination of a ground electrode layer 32, a nickel plating layer 34 and a tin plating layer 36, from the ceramic body 10 side. This will increase the adhesiveness between the external electrode 30 and ceramic body 10, allowing an external electrode 30 with excellent conductivity to be obtained. The ground electrode layer 32 forms ohmic joints with the internal electrodes 14, serving as the ground layer when the external electrode 30 is to be formed by a plating method. The ground electrode layer 32 comprises, for example, a metal component and a glass component. Examples of metal components include at least one metal selected from the group consisting of Ag, Pd, Zn, Al, Cu and Ni, and alloys having these metals as constituent elements. When the internal electrode is Ni, the metal component of the ground electrode layer is preferably Ag/Zn alloy or Ag/Al alloy. The glass component is preferably "lead-free".

Figure 2:
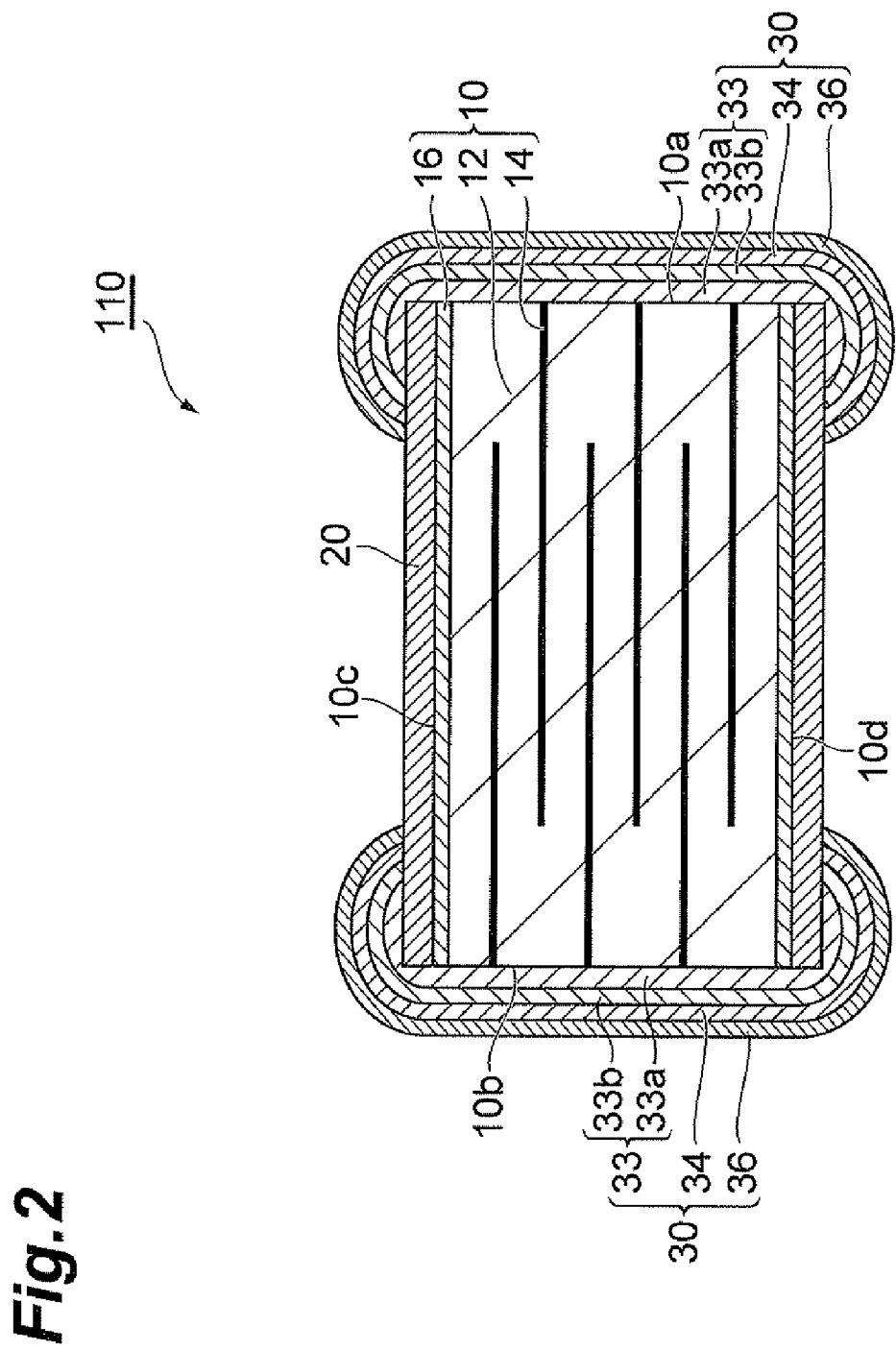
FIG. 2 is a cross-sectional view showing a modification of the preferred example of a multilayer PTC thermistor of the invention.

FIG. 2 is a cross-sectional view showing a modified example of a multilayer PTC thermistor of this embodiment. The multilayer PTC thermistor 110 of the modified example differs from the multilayer PTC thermistor 100 in that the ground electrode layer 33 is composed of two layers, an ohmic layer 33a and a cover layer 33b. The ohmic layer 33a is a layer allowing ohmic joints to be formed with the internal electrodes 14.

When the internal electrodes 14 contain Ni, the ohmic layer 33a is preferably a Ag/Zn alloy layer. The Ag/Zn alloy layer may be formed, for example, by coating a paste containing silver powder and Zn powder, and firing it. In this case, however, open voids tend to be generated by the Kirkendall phenomenon. Thus, direct wet plating can result in infiltration of the plating solution from the open voids of the ground electrode layer 33 into the ceramic body 10, impairing the reliability. Therefore, by forming a dense cover layer 33b to cover the entirety of the ohmic layer 33a, it is possible to prevent infiltration of the plating solution into the interior of the ceramic body 10 during plating treatment. The cover layer 33b may be, for example, an Ag layer formed by coating and firing a paste containing silver powder with a mean particle size of no greater than 1 μm.

The glass layer 20 covering the sides of the main sides 10c, 10d of the ceramic body 10 is made of a glass component. The glass layer 20 comprises an oxide of at least one element selected from the group consisting of zinc (Zn) and bismuth (Bi), as a major component. The "main component", according to the present specification, is the component with the greatest content ratio. The thickness of the glass layer 20 is preferably 3 μm or greater.

The glass component of the glass layer 20 may be $Bi_2O_3$—ZnO—$B_2O_3$ glass, $Bi_2O_3$—$B_2O_3$—ZnO glass, $Bi_2O_3$—$SiO_2$—$B_2O_3$ glass or the like, comprising bismuth oxide as the major component. A glass component comprising bismuth oxide as the major component has a low softening temperature, and it can therefore be treated at a relatively low temperature even if the firing temperature is set sufficiently higher than the softening temperature during formation of the glass layer 20. Specific examples of glass components comprising bismuth oxide as the major component include components containing 84 mass % $Bi_2O_3$, 9 mass % ZnO, 4 mass % $SiO_2$ and 3 mass % $Al_2O_3$. The softening temperature of the glass component having such a composition is 520° C., and therefore the glass is sufficiently softened during firing even at a temperature of 600° C., allowing formation of a glass layer 20 with no pinholes.

A glass component comprising zinc oxide as the major component may be ZnO—$SiO_2$—$B_2O_3$. Specific examples include components containing 59.7 mass % ZnO, 27.6 mass % $B_2O_3$, 9.4 mass % $SiO_2$ and 3.3 mass % $Al_2O_3$. The softening temperature of such a glass component is 633° C., and therefore firing at 700° C. allows formation of a glass layer 20 with sufficiently reduced pinholes.

The alkali oxide content of the glass layer 20 is no greater than 0.8 mass % and preferably no greater than 0.6 mass %. By reducing the alkali oxide content of the glass layer 20, it is possible to lower the volume of gas generated during formation of the glass layer 20, and thus adequately reduce the number of pinholes. This will allow the glass layer 20 to be obtained as a dense layer. Alkali oxides include $Na_2O$, $K_2O$ and $Li_2O$. The alkali oxide content may be quantified using fluorescent X-rays, or by atomic absorption or ICP analysis after dissolution in hydrofluoric acid or the like.

The $SiO_2$ content of the glass layer 20 is preferably no greater than 20 mass % and more preferably no greater than 15 mass %. By thus reducing the $SiO_2$ content, it is possible to lower the softening temperature of the glass component, so that the firing temperature during formation of the glass layer 20 can be lowered even with a reduced alkali oxide content.

The softening temperature (Ts) of the glass layer 20 is preferably no higher than 590° C. and more preferably no higher than 550° C. By lowering the softening temperature, it is possible to form the glass layer 20 at a low firing temperature, thus allowing variation in the resistance value of the ceramic body 10 to be minimized.

The glass layer 20 preferably comprises amorphous glass. This will allow the glass layer 20 to be an even further densified layer, to even more adequately minimize deterioration of the ceramic body 10 that occurs with plating treatment.

The ceramic body 10 preferably has a diffusion layer 16 on both the main side 10c and the main side 10d, adjacent to the glass layer 20. The diffusion layer 16 is a layer having the same composition as the ceramic layer 12, and containing a glass component in the pores. The glass component is preferably the same glass component present in the glass layer 20. If the ceramic body 10 has a diffusion layer 16 adjacent to the glass layer 20, it is possible to improve the adhesiveness between the glass layer 20 and ceramic body 10.

The thickness of the diffusion layer 16 is 2-3 μm, for example, and it is preferably smaller than the thickness of the glass layer 20. This will allow a multilayer PTC thermistor 100 to be obtained with even more excellent PTC characteristics, while adequately minimizing deterioration of the ceramic body 10 by plating treatment.

An example of a method for producing the multilayer PTC thermistor 100 of this embodiment will now be explained. The method for producing the multilayer PTC thermistor 100 comprises a step of mixing a starting material such as barium titanate (mixing step), a step of calcining the mixed material (calcining step), a step of pulverizing the calcined starting material (pulverizing step), a step of forming a stack in which the precursor layer for the ceramic layer (hereunder, "ceramic precursor layer") and the precursor layer for the internal electrode (hereunder, "internal electrode precursor layer") are alternately laminated (molding step), a step of removing the binder in the stack (binder removal step), a step of firing the stack after the binder removal step in a reducing atmosphere to form a porous sintered compact (firing step), a step of reoxidation of the surface layer of the porous body to obtain a ceramic body (reoxidation step), a step of attaching a glass powder-containing slurry to the main side and lateral sides of the ceramic body and firing it to form a glass layer (glass layer-forming step), and a step of forming an external electrode on the end face of the ceramic body (electrode-forming step). Each of these steps will now be explained in detail.

First, in the mixing step, a starting powder for formation of the ceramic layer 12 is prepared. The starting powder is a metal oxide or salt (carbonate or nitrate) composing the barium titanate-based ceramic material as the main component of the ceramic layer 12. After the starting powders are weighed out into the prescribed amounts, they are placed in a nylon pot together with purified water and a pulverizing ball and then pulverized and mixed for 4-8 hours and dried to obtain mixed powders.

In the calcining step, the mixed powder is pre-molded if necessary and calcined for about 0.5-5 hours in air at a temperature of about 1000-1150° C. to obtain a calcined body.

In the pulverizing step, the calcined body is first pulverized to obtain calcined powder. Next, the calcined powder is placed in a nylon pot together with purified water and a pulverizing ball, and prescribed amounts of a solvent, binder and plasticizer are added and mixed therewith for about 10-20 hours to obtain slurry for a green sheet with a prescribed viscosity. A prescribed amount of a dispersing agent may also be added to the slurry if necessary.

In the molding step, the ceramic precursor layer and internal electrode precursor layer are layered to obtain a stack in which the internal electrode precursor layer is situated between adjacent ceramic precursor layers. Specifically, first the green sheet slurry is coated onto a polyester film or the like using a method such as a doctor blade method and dried to obtain a green sheet (ceramic precursor layer). The thickness of the green sheet may be about 10-100 μM.

Screen printing or the like is used to print a paste for the internal electrode onto the top of the green sheet obtained in the manner described above. This forms an internal electrode precursor layer composed of the internal electrode paste on the green sheet (ceramic precursor layer). The internal electrode paste may be obtained by, for example, mixing and preparing a metal powder and an electrical insulating material (varnish). The metal powder used may be, for example, Pd powder, Pd alloy powder, Ni powder or Ni alloy powder.

A plurality of the green sheets on which the internal electrode precursor layers have been formed are then stacked, and green sheets with no internal electrode precursor layers are stacked above and below, after which the stack is pressed and contact bonded from the direction of lamination using a pressing machine to obtain a pressed stack. The pressed stack is cut to a prescribed size using a cutter or the like to obtain a layered stack. The layered stack is formed to have the structure of the ceramic body 10 of the multilayer PTC thermistor 100. Specifically, the stack has a construction wherein the green sheet (ceramic precursor layer) and internal electrode precursor layer are alternately layered, and one end of each internal electrode precursor is exposed at one end face 10a (or 10b) of the stack, while the other end face of the internal electrode precursor is enclosed inside the stack.

In the binder removal step, the obtained stack is held in air at about 250-600° C. for 1-10 hours to remove the liquid components from the stack, including the binder in the green sheet.

In the firing step, the binder-removed stack is fired for about 0.5-4 hours in a reducing atmosphere at about 1200-1250° C. to obtain a porous sintered compact (ceramic body 10). The reducing atmosphere is an atmosphere that does not cause oxidation at least in the internal electrode precursor layer, and for example, it may be a mixed atmosphere of hydrogen and nitrogen. This will allow oxidation of the internal electrode to be prevented even when a base metal (Ni, a Ni alloy or the like) is present in the internal electrode precursor layer.

In the reoxidation step, the fired porous sintered compact is dipped in an alkali metal salt solution of sodium nitrate or the like and then removed and subjected to heat treatment in air at 650° C.-800° C. to obtain a ceramic body. This will result in reoxidation of the metal oxide on the surfaces of the open pores in the sintered compact that has been reduced in the firing step, so that a PTC characteristic will be exhibited.

In the glass layer-forming step, glass powder is attached to the main side and lateral sides of the ceramic body and fired to form a glass layer. Specifically, first a slurry (dispersion) is prepared containing the glass powder, polyvinyl alcohol and a solvent. The slurry may be prepared, for example, by stirring the glass powder, polyvinyl alcohol and solvent with a ball mill. The solvent used may be a mixture of water and ethanol.

The slurry prepared in this manner is blasted onto the main side and lateral sides of the ceramic body 10 using a barrel spray apparatus, to form a coating film containing the glass powder on the main side and lateral sides. The coating film formed in this manner is fired in air to form a glass layer 20. During the firing, gas in the pores of the ceramic body 10 expands and effuses out from the melted glass layer. In order to inhibit generation of pinholes that occurs by this effusion, the firing temperature may be raised and the glass viscosity reduced, so that the number of pinholes is reduced by inflow of glass into the generated pinholes.

In order to adequately lower the glass viscosity during firing, the firing temperature is preferably a temperature of at least 40° C. higher than the softening temperature (Ts) [(Ts+40° C.) or above]. The glass that contains the alkali oxide at high concentration tends to have pinhole formation as the water adsorbed onto the alkali oxide gasifies causing expansion of the glass itself. For this embodiment, a glass component (for example, non-alkaline glass) with an alkali metal oxide content, i.e. alkali oxide content, of no greater than 0.8 mass % is used. Since virtually no expansion of the glass component itself occurs with such a glass component, even if the glass layer 20 is formed by firing at a temperature of 100° C. higher than the softening temperature [(Ts+100° C.) or above], the firing temperature may be appropriately set to form a dense glass layer 20 with sufficiently reduced pinholes.

From the viewpoint of forming an even denser glass layer 20, the firing temperature is preferably at least 80° C. higher than the softening temperature (Ts) [(Ts+80° C.) or above] of the glass component. On the other hand, if the crystallization temperature (Tc1) of the glass is lower than the firing temperature, the glass component will undergo crystallization forming a polycrystalline glass layer 20, often leading to infiltration of the plating solution from the gaps at the grain boundaries. In addition, if the temperature difference between the firing temperature (T) and the crystallization temperature (Tc1) of the glass component (Tc1−T) is 40° C. or less, a portion of the glass component may undergo crystallization. From this viewpoint, when the glass component contains crystallized glass, the crystallization temperature of the crystallized glass is preferably a temperature of at least 120° C. higher than the softening temperature (Ts) [(Ts+120° C.) or above]. That is, the relationship represented by inequality (6) is preferably satisfied.

$$Tc1 \geq Ts+120 \quad (6)$$

As the glass layer 20 is formed, a diffusion layer 16 is also formed on the main sides 10c, 10d and lateral sides of the ceramic body 10. That is, when the glass layer 20 is formed by firing, the glass component in the coating film diffuses in the pores near the surface of the ceramic body 10, producing a diffusion layer 16 with the glass component in the pores. The thickness of the diffusion layer 16 can be adjusted by varying the glass layer 20 firing temperature and time.

The firing temperature for formation of the glass layer 20 is preferably no higher than 600° C., from the viewpoint of sufficiently lowering the DC resistance of the multilayer PTC thermistor. The glass component adhering to the end faces 10a, 10b of the ceramic body 10 is preferably removed before forming the glass layer 20. This will allow easy evacuation of gas that has expanded in the pores of the ceramic body 10 during firing of the glass, so that pinholes in the glass layer 20 can be further reduced. It will also be possible to adequately reduce connection resistance between the internal electrodes 14 and the ground electrode layer 32(33) of the multilayer PTC thermistor 100 that is finally obtained.

In the electrode-forming step, an external electrode is formed comprising a ground electrode layer 32, nickel plating layer 34 and tin plating layer 36 on the end faces 10a, 10b of the ceramic body 10, in that order from the end face 10a, 10b sides. First, for formation of the ground electrode layer 32, there is prepared a conductive paste comprising a solvent and a mixture of 30-60 parts by mass of zinc powder with respect to 100 parts by mass of silver powder, or a mixture of 40-70 parts by mass of aluminum powder with respect to 100 parts by mass of silver powder. The conductive paste may be adhered onto the end faces 10a, 10b of the ceramic body 10 and baked in air at 550-650° C.

The ground electrode layer may have a two-layer structure comprising an ohmic layer 33a and a cover layer 33b, as shown in FIG. 2. When the ohmic layer 33a is formed by firing a mixture of silver powder and zinc powder, for example, open voids will tend to be generated by the Kirkendall phenomenon during firing. Direct wet plating can result in infiltration of the plating solution from the open voids of the ground electrode layer 33 into the ceramic body 10, reducing the reliability. Consequently, by forming a dense cover layer 33b to cover the entirety of the ohmic layer 33a, it is possible to inhibit infiltration of the plating solution into the interior of the ceramic body 10 during plating treatment.

The cover layer 33b may be, for example, an Ag layer formed by coating and firing a paste containing silver powder with a mean particle size of no greater than 1 μm. Glass powder (frit) is preferably added to the paste for the cover layer 33b at 11-10 mass % with respect to the total paste, in order to promote sintering and increase the denseness. By thus adding glass powder, the glass component acts as a sintering aid so that sintering of the metal powder is promoted and generation of voids is inhibited, while the glass simultaneously becomes softened during firing and the voids can become filled by the glass component, thus allowing the cover layer 33b to maintain satisfactory denseness. The composition of the glass powder is preferably approximately the same as the composition of the glass layer 20.

Baking of the ground electrode layer 32(33) may be carried out simultaneously with firing of the glass layer 20. This will allow the production process to be simplified.

The nickel plating layer 34 may be formed by electric barrel plating. The plating solution used may be a Watt bath, nickel sulfaminate plating bath or the like. The plating solution used is preferably one that does not easily cause corrosion of the glass layer 20. The nickel plating layer 34 is a barrier layer that prevents diffusion of the tin in the tin plating layer 36 into the ground electrode layer 32(33), and its thickness may be 2-4 μm for example.

The tin plating layer 36 may be formed by electric barrel plating, following formation of the nickel plating layer 34. The tin plating solution used for formation of the tin plating layer 36 is preferably a neutral tin plating solution of pH 4-10, from the viewpoint of adequately minimizing corrosion of the glass layer 20.

By the steps described above it is possible to obtain a multilayer PTC thermistor 100 such as shown in FIG. 1. In the production method described above, the main sides 10c, 10d and lateral sides of the ceramic body 10 become covered by the glass layer 20 during the plating treatment, and the end faces 10a, 10b of the ceramic body 10 become covered by the ground electrode layer 32. Also, the glass layer 20 has a sufficiently reduced alkali oxide content, while containing an oxide of at least one type of element selected from the group consisting of zinc and bismuth as the major component, and therefore pinholes are adequately reduced. Consequently, infiltration of the plating solution into the ceramic body 10 during the plating treatment can be adequately minimized. The multilayer PTC thermistor 100 therefore has an excellent PTC characteristic.

The embodiments described above are only preferred embodiments of the invention, and the invention is in no way limited thereto. For example, the glass layer 20 may cover, instead of the entirety of the main sides 10c, 10d and lateral sides of the ceramic body 10, only the sections where no external electrode 30 is formed.

EXAMPLES

The present invention will now be explained in greater detail with respect to examples and comparative examples, with the understanding that the invention is not limited to the examples.

Example 1-1

Fabrication of Multilayer PTC Thermistor

Fabrication of Ceramic Body

As oxide powders there were prepared $BaCO_3$ powder, $TiO_2$ powder, $Gd_2O_3$ powder and $Nb_2O_5$ powder. The oxide powders were each weighed out in an amount for a final barium titanate-based compound composition according to formula (7). The weighed oxide powders were placed in a nylon pot together with purified water and a pulverizing ball and mixed for 6 hours and dried to obtain a mixed powder.

$$(Ba_{0.9985}Gd_{0.0015})_{0.995}(Ti_{0.9985}Nb_{0.0015})O_3 \quad (7)$$

After subsequent pre-molding of the mixed powder, it was held for 4 hours in air at 1150° C. and calcined to obtain a calcined body. The calcined body was shredded to form a calcined powder with a mean particle size of 1 µm. The prepared calcined powder was placed in a nylon pot together with a solvent, a binder, a plasticizer, purified water and a pulverizing ball, and mixed therewith for 20 hours using a triple roll to obtain a green sheet slurry. The mixing ratios of the solvent, binder and plasticizer were 50 parts by mass, 5 parts by mass and 2.5 parts by mass, respectively, to 100 parts by mass of the calcined powder.

The obtained green sheet slurry was coated onto the polyester film by a doctor blade method and dried, and then punched out to dimensions of 50 mm×50 mm to fabricate a plurality of 20 µm-thick green sheets (ceramic precursor layers). The internal electrode paste was printed onto the top of each green sheet by screen printing to form an internal electrode pattern. The internal electrode paste was prepared by kneading 10 parts by mass of $BaTiO_3$ as the electrical insulating material with 100 parts by mass of Ni powder with a mean particle size of 0.2 µm.

Five of the green sheets on which the internal electrode pattern had been formed were then layered, and green sheets with no internal electrode pattern formed thereon were stacked above and below the stack, which was then pressed and contact bonded from the direction of lamination using a pressing machine to obtain a pressed stack. The pressed stack was cut with a cutter to form 13,000 stacks with 1.6 mm×0.8 mm×0.8 mm dimensions. Here, one end face of the internal electrode pattern extended to the edge of the green sheet, while the other end face was cut so that it was located on the inner side of the green sheet. The spacing of the internal electrode pattern in the direction of lamination was 14 µm.

Each obtained stack was heated in air at 300° C. for 8 hours to remove the binder from the stack. The stack was then fired for 2 hours in a reducing atmosphere at 1200° C. to obtain a porous sintered compact. The mean value for the relative density of the sintered compact was 81%. The reducing atmosphere was a mixed atmosphere of hydrogen and nitrogen with a hydrogen/nitrogen volume ratio of 1:99, and the dew point of the mixed atmosphere was 10° C.

The sintered compact was then impregnated with an alkali metal salt solution (8 mass % aqueous solution of $NaNO_3$). After impregnation, the sintered compact was dried in air at ordinary temperature for 1 hour. The sintered compact was heated and held in air at 700° C. for 2 hours for reoxidation, to obtain a ceramic body.

<Formation of Glass Layer>

The ceramic body was removed from the furnace, and then a Φ200 barrel spray apparatus was immediately used to form a glass powder layer on the surface of the ceramic body, in the following order. First, glass powder was prepared having a softening point of 518° C. and a mean particle size of 1.2 µm, and the glass powder was mixed with a polyvinyl alcohol resin at a mass ratio of 95:5. The glass powder used in this case was bismuth-based non-alkaline glass (main component: $Bi_2O_3$) containing 84 mass % $Bi_2O_3$, 9 mass % ZnO, 4 mass % $SiO_2$ and 3 mass % $Al_2O_3$.

The mixture of glass powder and polyvinyl alcohol prepared as described above was mixed with a solvent in a mass ratio of 2.5:97.5, and stirred for 16 hours with a ball mill. The solvent used was a mixture of water and ethanol in a mass ratio of 8:2. Next, 900 g of the ceramic body was loaded into a barrel spray apparatus and a coating film comprising the glass powder was formed on the main side of the ceramic body. The hot air temperature was 70° C., the barrel rotation speed was 5 rpm (circumferential speed: 0.05 m/s), and the slurry throughput and coating time were appropriately adjusted. After forming the coating film, there was no adhesion between stacks and no corners of the ceramic body were exposed. The mean value for the coating film thickness on the main side of the ceramic body was 15 µm.

The ceramic bodys on which the glass powder-containing coating film had been formed was fired under the following conditions, 100 bodies at a time. First, the ceramic body was heated to 600° C. (firing temperature) at a rate of 20° C./min and held at that temperature for 10 minutes, and then the temperature was lowered to room temperature at a rate of 20° C./min. This formed a glass layer on the main side of the ceramic body. The mean value for the glass layer thickness was 10 µm.

<Formation of External Electrodes>

The glass component adhering to the end faces of the ceramic body was then removed by blasting, and a conductive paste containing silver and zinc was coated. The coated conductive paste was fired in air at 550° C. for 10 minutes, to form a chip having ground electrode layers on the end faces of the ceramic body.

The formed chip was processed by electric barrel plating for selective formation of a plating layer on the ground electrode layer, by the following procedure. First, a Watt bath was used to form a nickel plating layer with a 2 μm thickness on the ground electrode layer at a speed of 2 μm/hr, and then a neutral tin plating bath was used to form a tin plating layer with a thickness of 4 μm at a speed of 4 μm/hr. No tin plating or nickel plating adhered to the sections of the ceramic body on which the ground electrode layer had not been formed.

Using this procedure, there was obtained a multilayer PTC thermistor comprising a ceramic body, a glass layer on its main side, and external electrodes each having a ground electrode layer, a tin plating layer and a nickel plating layer on the end faces, in that order from the ceramic body side. This was used as a multilayer PTC thermistor (sample) for Example 1. A total of 1000 samples of multilayer PTC thermistors were fabricated by the same procedure. The glass component in the glass layer of each multilayer PTC thermistor of Example 1-1 was not crystallized glass, and had a softening temperature of 518° C. The properties of the glass layer of the multilayer PTC thermistor of Example 1 are listed in Table 1.

[Evaluation of Multilayer PTC Thermistors]

<Outer Appearance Evaluation>

The outer appearance of each obtained multilayer PTC thermistor was evaluated by the following procedure. The surface of the multilayer PTC thermistor was observed at 100× magnification using a stereomicroscope. Samples with no adhesion of the plating to the ceramic body surface and without discoloration of the ceramic body with plating treatment were judged as "satisfactory", while those with adhesion of the plating to the ceramic body surface or with discoloration of the ceramic body were judged as "unsatisfactory". The percentage of defects with respect to the total number was recorded as the outer appearance defect rate. The results were as shown in Table 2.

<Evaluation of Thickness of Glass Layer and Diffusion Layer>

The multilayer PTC thermistor was cut perpendicular to the main side, and the cut surface was polished and observed with a scanning electron microscope (SEM, magnification: 5000×). Using the observed image, the thickness of the glass layer at the center section of the main side of the ceramic body and the thickness of the diffusion layer at the center section of the main side of the ceramic body were determined. The diffusion layer was the section where the glass component filled the interiors of the pores of the ceramic body at the surface section of the ceramic body. The same measurement was conducted for each sample, and the mean value of the measured values was calculated. The results were as shown in Table 2.

<Evaluation of Change in Resistance During Mounting>

The resistance value (R0) of the sample before mounting on the substrate and the resistance value (R1) after mounting on the substrate using lead-free solder (trade name: M705) were measured, and the change in resistance with mounting [calculated as (R1−R0)/R0] was determined. The same measurement was conducted for each sample, and the mean value of the measured values was calculated. The results were as shown in Table 2.

<Evaluation of Jump Characteristic>

The jump characteristics of the ceramic body before formation of the glass layer, and of the multilayer PTC thermistor (sample), were evaluated by the following procedure. The resistance of the ceramic body and the multilayer PTC thermistor at 25° C. (room temperature resistance ($R_{25}$), units: Ω), and the resistance at 200° C. (high-temperature resistance ($R_{200}$), units: Ω) were measured. Based on these measured values, the resistance variation width $R_{200}/R_{25}$ was calculated, and $\log_{10}(R_{200}/R_{25})$ was determined. A $\log_{10}(R_{200}/R_{25})$ of 3 or greater was judged as satisfactory. The same measurement was conducted for each sample, and the mean value of the measured values was calculated. The results were as shown in Table 2.

Example 1-2

A multilayer PTC thermistor was obtained in the same manner as Example 1-1, except that the glass powder used was zinc-based glass (main component: ZnO) containing 59.7 mass % ZnO, 27.6 mass % $B_2O_3$, 9.4 mass % $SiO_2$ and 3.3 mass % $Al_2O_3$, instead of bismuth-based non-alkaline glass, and the firing temperature for formation of the glass layer was changed to 710° C.

The multilayer PTC thermistor comprised a ceramic body, a glass layer on its main side, and external electrodes each having a ground electrode layer, a tin plating layer and a nickel plating layer on the end faces, in that order from the ceramic body side. This was used as a multilayer PTC thermistor for Example 1-2. Multilayer PTC thermistors were fabricated by the same procedure, to produce a total of 1000 multilayer PTC thermistors. The softening temperature of the glass component in the glass layer of each multilayer PTC thermistor of Example 2-1 was 631° C., and the crystallization temperature was 750° C. The obtained multilayer PTC thermistor was evaluated in the same manner as Example 1-1. The properties of the glass layer are shown in Table 1, and the evaluation results are shown in Table 2.

Comparative Example 1-1

A multilayer PTC thermistor was obtained in the same manner as Example 1, except that the glass powder used was silica-based glass (main component: $SiO_2$) containing 53.0 mass % $SiO_2$, 17.3 mass % $B_2O_3$, 9.4 mass % $Na_2O$, 6.8 mass % $ZrO_2$, 4.2 mass % $Al_2O_3$, 3.6 mass % ZnO, 3.5 mass % $Li_2O$ and 2.2 mass % $TiO_2$, instead of the bismuth-based non-alkaline glass, and the firing temperature during glass layer formation was 680° C. The multilayer PTC thermistor comprised a ceramic body, a glass layer on its main side, and external electrodes each having a ground electrode layer, a tin plating layer and a nickel plating layer on the end faces, in that order from the ceramic body side. This was used as a multilayer PTC thermistor for Comparative Example 1-1. Multilayer PTC thermistors were fabricated by the same procedure, to produce a total of 1000 multilayer PTC thermistors.

The softening temperature of the glass component in the glass layer of multilayer PTC thermistor of Comparative Example 1-1 was 600° C., and the crystallization temperature was 860° C. The obtained multilayer PTC thermistor was evaluated in the same manner as Example 1-1. The properties of the glass layer are shown in Table 1, and the evaluation results are shown in Table 2.

Example 1-3

A multilayer PTC thermistor was obtained in the same manner as Example 1, except that the glass powder used was bismuth-based non-alkaline glass (main component: $Bi_2O_3$) containing 84 mass % $Bi_2O_3$, 9 mass % ZnO, 4 mass % $SiO_2$ and 3 mass % $Al_2O_3$, and the firing temperature for formation of the glass layer was changed to 490° C. The multilayer PTC thermistor comprised a ceramic body, a glass layer on its main side, and external electrodes each having a ground electrode layer, a tin plating layer and a nickel plating layer on the end faces, in that order from the ceramic body side.

This was used as a multilayer PTC thermistor for Example 1-3. Multilayer PTC thermistors were fabricated by the same procedure, to produce a total of 1000 multilayer PTC thermistors. The softening temperature of the glass component in the glass layer of each multilayer PTC thermistor of Example 1-3 was 410° C., and the crystallization temperature was 470° C. The obtained multilayer PTC thermistor was evaluated in the same manner as Example 1-1. The properties of the glass layer are shown in Table 1, and the evaluation results are shown in Table 2.

Comparative Example 1-2

A multilayer PTC thermistor was obtained in the same manner as Example 1-1, except that the glass powder used was silica-based non-alkaline glass (main component: $SiO_2$) with a $SiO_2$ content of 50 mass % or greater, and the firing temperature for glass layer formation was changed to 850° C. The multilayer PTC thermistor comprised a ceramic body, a glass layer on its main side, and external electrodes each having a ground electrode layer, a tin plating layer and a nickel plating layer on the end faces, in that order from the ceramic body side.

This was used as a multilayer PTC thermistor for Comparative Example 1-2. Multilayer PTC thermistors were fabricated by the same procedure, to produce a total of 1000 multilayer PTC thermistors. The glass component in the glass layer of each multilayer PTC thermistor of Comparative Example 1-2 was not crystallized glass, and had a softening temperature of 770° C. The obtained multilayer PTC thermistor was evaluated in the same manner as Example 1-1. The properties of the glass layer are shown in Table 1, and the evaluation results are shown in Table 2.

Comparative Example 1-3

A ceramic body was fabricated in the same manner as Example 1-1. The ceramic body was immersed for 30 minutes in commercially available water glass. After immersion, the ceramic body was treated using a spin dryer at 1500 rpm for 1 minute to remove the water glass adhering to the surface of the ceramic body. The spin dryer used had a diameter of 20 cm. The water glass used was #2 ($SiO_2$ content: 34-36 mass %, $Na_2O$ content: 14-16 mass %, water content: remainder (according to JIS K1408)).

Next, the ceramic body was fired at 670° C. for 10 minutes to form a diffusion layer near the main side of the ceramic body. A glass layer was also formed on the main side of the ceramic body.

An external electrode was formed on both end faces of the ceramic body, in the same manner as Example 1-1, and a multilayer PTC thermistor was obtained comprising a ceramic body, a glass layer on its main side, and external electrodes each having a ground electrode layer, a tin plating layer and a nickel plating layer on the end faces, in that order from the ceramic body side. This was used as a multilayer PTC thermistor for Comparative Example 1-3. Multilayer PTC thermistors were fabricated by the same procedure, to produce a total of 1000 multilayer PTC thermistors. Each obtained multilayer PTC thermistor was evaluated in the same manner as Example 1-1. The evaluation results were as shown in Table 2.

TABLE 1

| | α ($\times 10^{-7}$) | Tg (° C.) | γp (° C.) | Ts (° C.) | Tw (° C.) | Tcl (° C.) |
|---|---|---|---|---|---|---|
| Example 1-1 | 77 | 445 | 490 | 518 | 530 | — |
| Example 1-2 | 43 | 553 | 592 | 631 | 650 | 750 |
| Example 1-3 | 107.5 | 362 | 388 | 414 | 424 | 472 |
| Comp. Ex. 1-1 | 75 | 480 | 550 | 600 | 625 | 860 |
| Comp. Ex. 1-2 | 56 | 670 | 740 | 770 | 805 | — |

*α: Expansion coefficient ($\times 10^{-7}$), Tg: Glass transition point, γp: Yield point (° C.), Ts: Softening temperature, Tw: Glass working point, Tcl: Crystallization temperature

TABLE 2

| | Glass layer thickness (μm) | Diffusion layer thickness (μm) | Outer appearance defect rate (%) | Resistance variation during mounting | Jump characteristic Before glass formation | Jump characteristic After glass formation |
|---|---|---|---|---|---|---|
| Example 1-1 | 10 | 2.7 | 0% | ≦10% | 3.7 | 3.6 |
| Example 1-2 | 10 | 2.3 | 0% | ≦10% | 3.7 | 3.3 |
| Example 1-3 | 10 | 2.1 | 17% | ≦10% | 3.7 | 3.7 |
| Comp. Ex. 1-1 | 10 | 2.6 | 100% | 57% | 3.7 | 3.5 |
| Comp. Ex. 1-2 | 10 | 3.1 | 0% | 49% | 3.7 | 2.8 |
| Comp. Ex. 1-3 | 1.3 | 23 | 100% | | | |

Blank entries indicate unmeasurable properties.

The multilayer PTC thermistors of each example had low change in resistance upon mounting, and exhibited excellent thermistor properties. The outer appearance defect rate of the multilayer PTC thermistor of Example 1-3 was 17%. This was attributed to the fact that the firing temperature during formation of the glass layer was higher than the crystallization temperature of the glass component of the glass layer. That is, it is presumed that since the glass component in the glass layer crystallized, fine pinholes were produced in the glass layer.

Example 1-2 had a jump characteristic after glass layer formation which fell to 0.4 compared to before glass layer formation. This was due to the higher firing temperature with ZnO as the main component of the glass layer, compared to $Bi_2O_3$ as the main component. It is seen that $Bi_2O_3$ is preferred as the main component in the glass layer.

On the other hand, numerous pinholes were produced in the glass layer formed on the main side of the multilayer PTC thermistor of Comparative Example 1-1, and the plating adhered around the pinholes. In addition, the ceramic body suffered discoloration by the plating treatment. This is believed to be because the plating solution infiltrated into the ceramic body from the pinholes during plating treatment, and the plating solution penetrated into the pore interiors, resulting in diffusion of the plating solution through the entire ceramic body. In this case, the resistance between terminals also varied significantly by mounting. This is attributed to the fact that the plating solution component inside the ceramic body reacted with the ceramic body and internal electrode by the heating during mounting.

In the multilayer PTC thermistor of Comparative Example 1-2, discoloration of the ceramic body by plating treatment did not occur. However, the PTC jump value of the ceramic body before glass layer formation [$\log_{10}(R_{200}/R_{25})$] was 3.7, and the PTC jump value after glass layer formation was 2.8. With silica-based glass having a $SiO_2$ content of 50 mass % or greater, as in Comparative Example 1-2, when the alkali oxide content was 0.8 mass % or lower, the softening temperature was higher, requiring a higher firing temperature for formation of the glass layer (for example, 750° C. or higher). It was thus confirmed that formation of a glass layer significantly reduces the PTC jump characteristic.

The thickness of the glass layer of the multilayer PTC thermistor of Comparative Example 1-3 was 1.3 μm, and the thickness of the diffusion layer was 23 μm. It was confirmed that if the diffusion layer is thicker than the glass layer, pinholes tend to be generated in the glass layer even without expansion from the glass itself. When the glass layer is formed by firing, the glass component tends to be drawn into the ceramic body by surface tension between the ceramic body and melted glass. It is possible that, since the drawing force increases with a thicker diffusion layer, pinholes are generated more easily.

The multilayer PTC thermistor of Comparative Example 1-3 had plating adhering not only on the ground electrode layer but also on the main side of the ceramic body, and shorting defects occurred between terminals across the entire chip. This is conjectured to be due to the large amount of alkali oxides in water glass, such that high density pinholes were generated during firing after immersion in the water glass. The pinholes are presumably produced when moisture present at high concentration in the water glass gasifies during firing, resulting in effusion from the ceramic body interior.

Examples 2-1 to 2-5, Comparative Examples 2-6 and 2-7

Mixed glass powders were prepared with the glass powder used in Example 1-1, having $Na_2O$ contents as listed in Table 3 with respect to the total mixed glass powder. Multilayer PTC thermistors were obtained for Examples 2-1 to 2-5 and Comparative Examples 2-6 and 2-7 in the same manner as Example 1-1, except that the prepared mixed glass powders were used, and the firing temperature for formation of the glass layer was changed. The firing temperature for formation of the glass layer was a temperature of 80° C. higher than the softening temperature (Ts) of the glass powder (Ts+80° C.). Each multilayer PTC thermistor comprised a ceramic body, a glass layer on its main side, and external electrodes each having a ground electrode layer, a tin plating layer and a nickel plating layer on the end faces, in that order from the ceramic body side. For each of the examples and comparative examples, 1000 samples (multilayer PTC thermistors) were fabricated.

Figure 3:
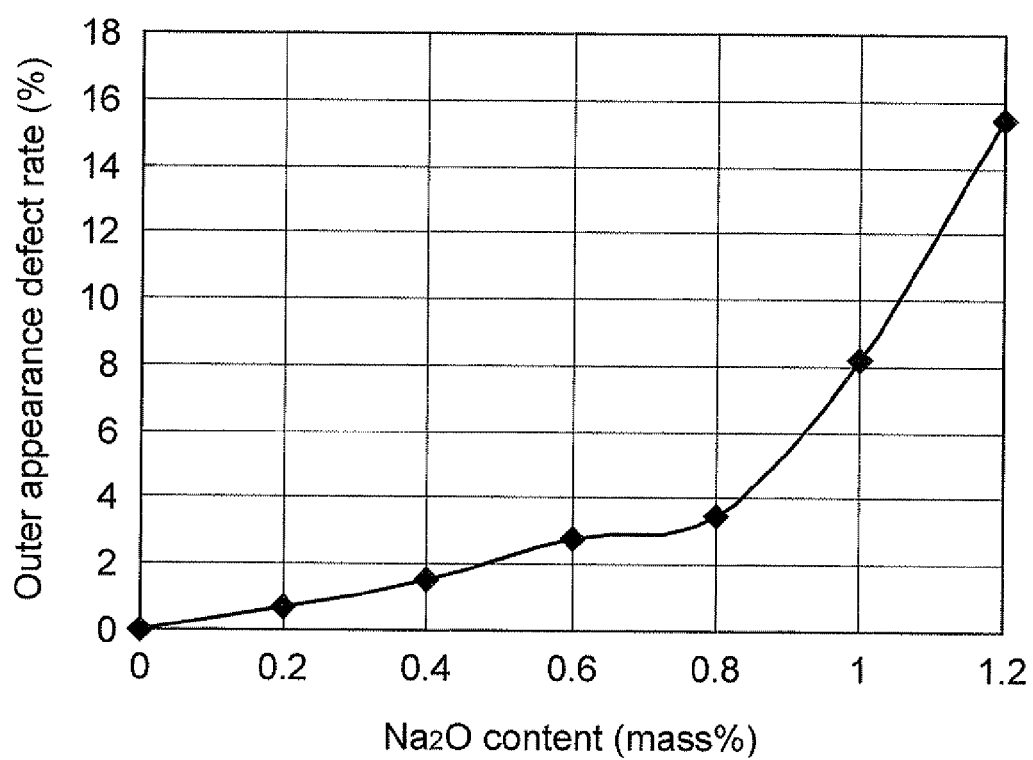
FIG. 3 is a graph showing the relationship between $Na_2O$ content in a mixed glass powder, and outer appearance defects.

The outer appearance defect rates for the multilayer PTC thermistors of Examples 2-1 to 2-5 and Comparative Examples 2-6 and 2-7 were determined in the same manner as Example 1-1. Table 3 shows the $Na_2O$ contents of the mixed glass powders and the results of calculating the outer appearance defect rates. FIG. 3 shows the relationship between the $Na_2O$ content in each mixed glass powder, and the outer appearance defect rate. When the alkali oxide content ($Na_2O$ content) increases, the number of pinholes generated by expansion of the glass increases when the glass layer is formed by firing. It is believed that the outer appearance defect rate increased because the plating adhered to the pinhole sections during plating treatment. It was confirmed that the outer appearance defect rate drastically increases when the $Na_2O$ content exceeds 0.8 mass % in the mixed glass powder.

TABLE 3

|  | $Na_2O$ content mass % | Outer appearance defect rate % |
| --- | --- | --- |
| Example 2-1 | 0 | 0 |
| Example 2-2 | 0.2 | 0.7 |
| Example 2-3 | 0.4 | 1.5 |
| Example 2-4 | 0.6 | 2.8 |
| Example 2-5 | 0.8 | 3.5 |
| Comp. Ex. 2-6 | 1.0 | 8.2 |
| Comp. Ex. 2-7 | 1.2 | 15.4 |

Examples 3-1 to 3-5

Multilayer PTC thermistors were formed in the same manner as Example 2-5, except that the firing during formation of the ceramic body and the firing during formation of the glass layer were carried out at the temperatures listed in Table 4. The firing temperature during formation of the glass layer was the temperature listed in Table 4, for the minimum outer appearance defect rate. The relative density and outer appearance defect rate for each ceramic body are shown in Table 4. The relative density for the ceramic body of each example was measured by Archimedes' method.

TABLE 4

|  | Firing temperature during ceramic body formation ° C. | Firing temperature during glass layer formation ° C. | Outer appearance defect rate % | Relative density % |
| --- | --- | --- | --- | --- |
| Example 3-1 | 1161 | 610 | 4.7 | 60 |
| Example 3-2 | 1179 | 605 | 3.8 | 70 |
| Example 3-3 | 1199 | 600 | 3.4 | 80 |
| Example 3-4 | 1218 | 550 | 0.2 | 90 |
| Example 3-5 | 1235 | 550 | 0 | 95 |

When the relative density of the ceramic body exceeds 90%, virtually no outer appearance defects were produced even with addition of $Na_2O$. This is presumably because a relative density of greater than 90% renders the ceramic body non-porous, and reduces the volume of gas generated from the ceramic body interior during formation of the glass layer by firing. Presumably, therefore, it is possible to lower the firing temperature during formation of the glass layer, thereby allowing expansion of the glass itself to be inhibited. When the relative density is less than 70%, the outer appearance defect rate increases sharply. This is attributed to an excessive volume of gas generated from the ceramic body interior during formation of the glass layer by firing, making it impossible to eliminate pinholes even when the firing temperature is raised to increase the flow property of the glass.

Examples 3-6 to 3-9

Multilayer PTC thermistors were fabricated with ceramic body relative densities of 60-90% in the same manner as Example 1-1, except that the firing temperature during formation of the ceramic body was adjusted. Table 5 shows the relationship between the Na$_2$O contents and outer appearance defect rates of the multilayer PTC thermistors. It was confirmed that the outer appearance defect rate is lower with increasing relative density.

TABLE 5

|  | Relative density % | Na$_2$O content mass % | Outer appearance defect rate % |
|---|---|---|---|
| Example 3-6 | 60 | 0 | 3.1 |
| Example 3-7 | 70 | 0 | 0.3 |
| Example 3-8 | 80 | 0 | 0.1 |
| Example 3-9 | 90 | 0 | 0.1 |

According to the invention it is possible to provide a multilayer PTC thermistor having low production cost and excellent PTC characteristics.

What is claimed is:

1. A multilayer PTC thermistor comprising:
 a ceramic body comprising a plurality of ceramic layers and internal electrodes between adjacent ceramic layers;
 external electrodes on the end faces of the ceramic body; and
 a glass layer on the surface of the ceramic body, the glass layer containing an oxide of at least one element selected from the group consisting of zinc and bismuth as the major component,
 wherein the alkali oxide content of the glass layer is no greater than 0.8 mass %.

2. The multilayer PTC thermistor according to claim 1, wherein the ceramic body has a diffusion layer in a manner adjacent to the glass layer, the diffusion layer comprising at least a part of the ceramic layer and a glass component in the pores of the ceramic layer, and
 wherein the thickness of the glass layer is greater than the thickness of the diffusion layer.

3. The multilayer PTC thermistor according to claim 1, wherein the ceramic body has pores containing an oxidizing gas.

4. The multilayer PTC thermistor according to claim 2, wherein the ceramic body has pores containing an oxidizing gas.

5. The multilayer PTC thermistor according to claim 1, wherein the glass layer comprises amorphous glass.

6. The multilayer PTC thermistor according to claim 2, wherein the glass layer comprises amorphous glass.

7. The multilayer PTC thermistor according to claim 3, wherein the glass layer comprises amorphous glass.

8. The multilayer PTC thermistor according to claim 1, wherein the glass layer is formed by adhering a dispersion comprising glass powder and a solvent onto the ceramic body, and heating it at above the softening temperature of the glass powder.

9. The multilayer PTC thermistor according to claim 2, wherein the glass layer is formed by adhering a dispersion comprising glass powder and a solvent onto the ceramic body, and heating it at above the softening temperature of the glass powder.

10. The multilayer PTC thermistor according to claim 3, wherein the glass layer is formed by adhering a dispersion comprising glass powder and a solvent onto the ceramic body, and heating it at above the softening temperature of the glass powder.

* * * * *